(12) United States Patent
Bienfang et al.

(10) Patent No.: US 9,180,558 B2
(45) Date of Patent: Nov. 10, 2015

(54) HYDRAULIC DOOR SNUBBER

(71) Applicant: Caterpillar Global Mining LLC, Oak Creek, WI (US)

(72) Inventors: David T. Bienfang, Racine, WI (US); Patrick B. Maguire, Kenosha, WI (US)

(73) Assignee: Caterpillar Global Mining LLC, Oak Creek, WI (US)

( * ) Notice: Subject to any disclaimer, the term of this patent is extended or adjusted under 35 U.S.C. 154(b) by 256 days.

(21) Appl. No.: 13/719,973

(22) Filed: Dec. 19, 2012

(65) Prior Publication Data

US 2014/0165431 A1 Jun. 19, 2014

(51) Int. Cl.
| | |
|---|---|
| *B23P 11/00* | (2006.01) |
| *E02F 3/60* | (2006.01) |
| *E02F 9/00* | (2006.01) |
| *E02F 9/22* | (2006.01) |
| *F15B 15/02* | (2006.01) |
| *F16F 7/02* | (2006.01) |

(52) U.S. Cl.
CPC . *B23P 11/00* (2013.01); *E02F 3/60* (2013.01); *E02F 9/006* (2013.01); *E02F 9/2217* (2013.01); *F15B 15/02* (2013.01); *F15B 2211/625* (2013.01); *F15B 2211/7052* (2013.01); *F15B 2211/76* (2013.01); *F16F 7/023* (2013.01); *Y10T 29/49826* (2015.01)

(58) Field of Classification Search
USPC .............................................. 37/445; 269/25
See application file for complete search history.

(56) References Cited

U.S. PATENT DOCUMENTS

| | | | | |
|---|---|---|---|---|
| 2,160,432 | A | * | 5/1939 | Davidson ........................ 37/444 |
| 4,534,598 | A | | 8/1985 | Cuhel |
| 4,679,839 | A | * | 7/1987 | Damron .................... 294/119.4 |
| 5,110,169 | A | | 5/1992 | Shepherd et al. |
| 5,451,087 | A | | 9/1995 | Beaulieu |
| 5,613,308 | A | | 3/1997 | Little |
| 5,815,960 | A | | 10/1998 | Soczka |
| 5,974,705 | A | * | 11/1999 | Isley et al. ....................... 37/444 |
| 6,467,202 | B1 | | 10/2002 | Brown, Jr. |
| 7,721,857 | B2 | * | 5/2010 | Harr .............................. 188/381 |
| 8,732,994 | B2 | * | 5/2014 | Dube et al. ...................... 37/445 |
| 2011/0239494 | A1 | | 10/2011 | Dube et al. |

* cited by examiner

*Primary Examiner* — Matthew D Troutman
(74) *Attorney, Agent, or Firm* — Foley & Lardner LLP (57) ABSTRACT

A dipper assembly for a mining shovel, includes a dipper having a dipper back and an open dipper bottom, and a dipper door pivotally mounted to the dipper, configured to pivot between an open position and a closed position with a swing speed, and to cover the open dipper bottom. The dipper assembly also includes one or more hydraulic door snubbers. The hydraulic door snubbers include a base having one or more connecting plates, one or more mounting plates coupled to the base and configured to receive a link extending from the dipper door, one or more friction plates, and a hydraulic cylinder configured to clamp the mounting plates, the connecting plates, the friction plates and the link together.

20 Claims, 9 Drawing Sheets

HYDRAULIC DOOR SNUBBER

TECHNICAL FIELD

This disclosure relates to shovel dippers, and particularly to a hydraulic door snubber for shovel dippers.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Shovel dippers are formed with teeth at their leading edge and a dipper door that normally closes the rear of the dipper to hold earth and other materials that are loaded into the dipper by the action of the shovel. The dipper door must be held closed while the dipper is being loaded and while the load in the dipper is swung to a deposit point. At that point, the dipper door is opened to allow the contents of the dipper to empty. The door is typically held closed by a mechanical latch, and is released by a cable or trip wire rope to allow the door to swing open under its own weight and the weight of the contents of the dipper. The door is re-latched by allowing it to swing closed by virtue of its own weight and the changing attitude of the dipper as the dipper rotates back in preparation for its next loading cycle. Dippers typically are equipped with a braking device on the dipper door linkage to reduce the swing speed as the door swings open and closed.

Conventional dipper door braking devices typically utilize a spring loaded bolted connection. As the door swings open or closed by virtue of its own weight, the bolted connection provides friction, reducing the swing speed of the dipper door. The bolted connection is typically tightened to a predetermined torque value to achieve the necessary friction braking force. However, the bolted connection tends to lose its torque value as the braking device wears. To maintain the predetermined torque value, the bolted connection must be adjusted regularly, resulting in machine downtime.

An example of another conventional dipper door braking device can be found in U.S. Pat. No. 6,467,202, issued Oct. 22, 2002, for "Dynamically Active Dipper Door Mechanism." This patent discloses a door that is controlled by a brake pivotally linking the door to the dipper. The brake may be controlled by linkage actuated by a linear actuator. This conventional dipper door braking device must be actuated to provide a braking force to the dipper door. Therefore, if not actuated, the braking device may permit the dipper door to swing freely by virtue of its own weight, potentially damaging the dipper or other machine components.

SUMMARY

An embodiment of the present disclosure relates to a dipper assembly for a mining shovel. The dipper assembly includes a dipper having a dipper back and an open dipper bottom, a dipper door pivotally mounted to the dipper, configured to pivot between an open position and a closed position with a swing speed, and to cover the open dipper bottom, and one or more hydraulic snubbers. The hydraulic snubbers include a base having one or more connecting plates, one or more mounting plates coupled to the base and configured to receive a link extending from the dipper door, one or more friction plates positioned parallel to the mounting plates and the link, and a hydraulic cylinder configured to clamp the mounting plates, the connecting plates, the friction plates and the link together, reducing the swing speed of the dipper door.

Another embodiment of the present disclosure relates to a hydraulic snubber for a door. The hydraulic snubber includes a base receiving the hydraulic cylinder and configured to couple to a pivotally mounted link, one or more mounting plates coupled to the base and configured to receive a link extending from the door, one or more friction plates positioned parallel to the mounting plates and the link, and a hydraulic cylinder configured to clamp the mounting plates, the friction plates and the link together.

Another embodiment of the present disclosure relates to a method for installing a hydraulic snubber for a dipper door. The method includes providing a base having one or more connecting plates configured to receive a hydraulic cylinder, providing one or more mounting plates configured to receive a hydraulic cylinder, providing one or more friction plates configured to receive a hydraulic cylinder, providing a link configured to pivot about the base, the link having one or more mating plates configured to receive a hydraulic cylinder, positioning the mounting plates, friction plates, and mating plates adjacent to and parallel to each other, inserting a hydraulic cylinder through the base and through each of the mounting plates, friction plates, and mating plates, retaining the hydraulic cylinder substantially within the base, and applying compressive force to the hydraulic snubber by pumping pressurized hydraulic fluid into the hydraulic cylinder, reducing the pivotal motion of the link about the base.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
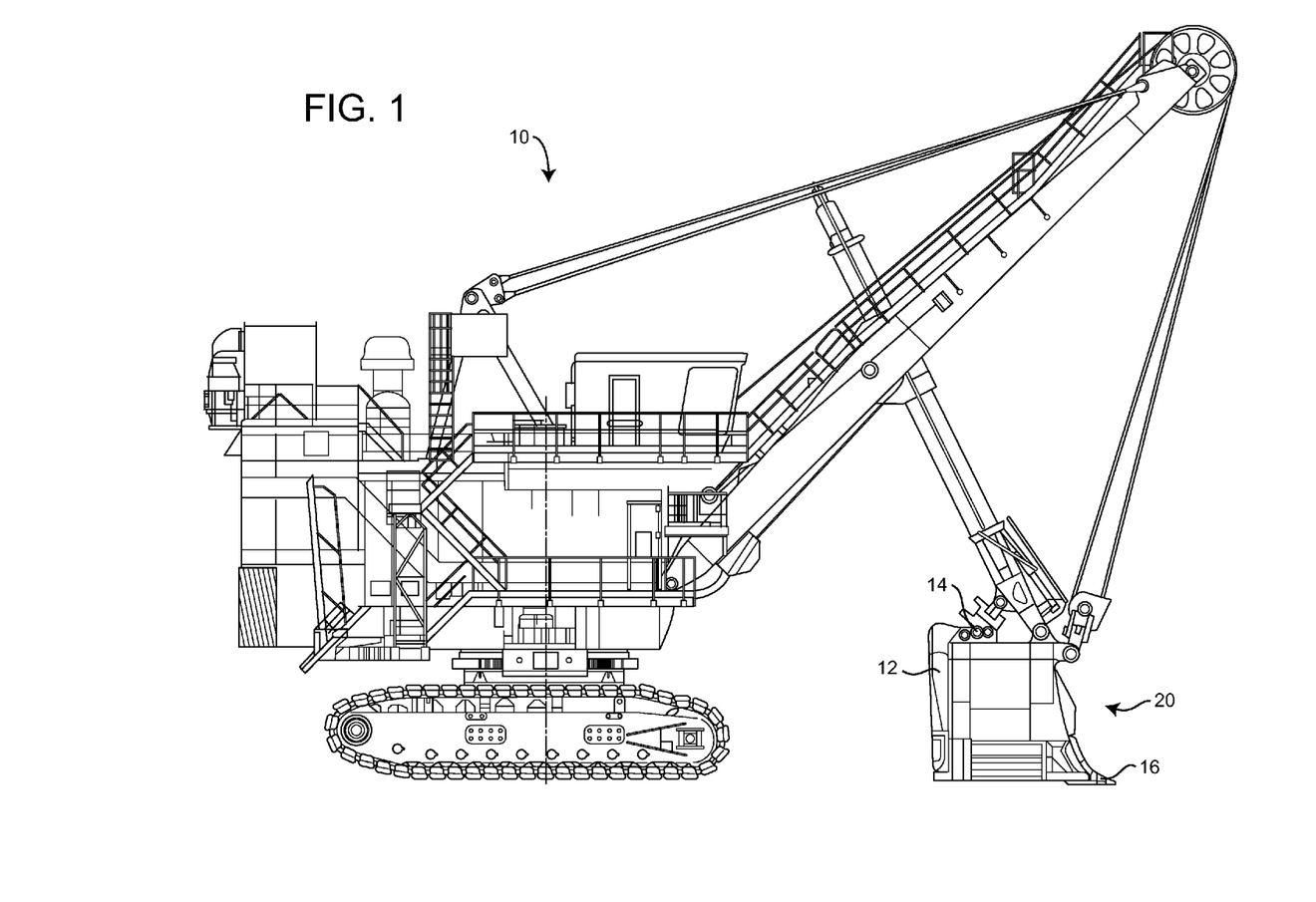
FIG. 1 is a side view of a mining shovel having a dipper.

Referring to FIG. 1, a mining shovel 10 is shown, according to an exemplary embodiment. The mining shovel 10 includes a dipper assembly 20 configured to hold earth and other materials that are loaded into the dipper assembly 20 by the action of a front shovel portion 16. The dipper assembly 20 includes a dipper door 12 that rotates around a pinned connection 14. The dipper door 12 is configured to open and close in part by virtue of its own weight.

Figure 2:
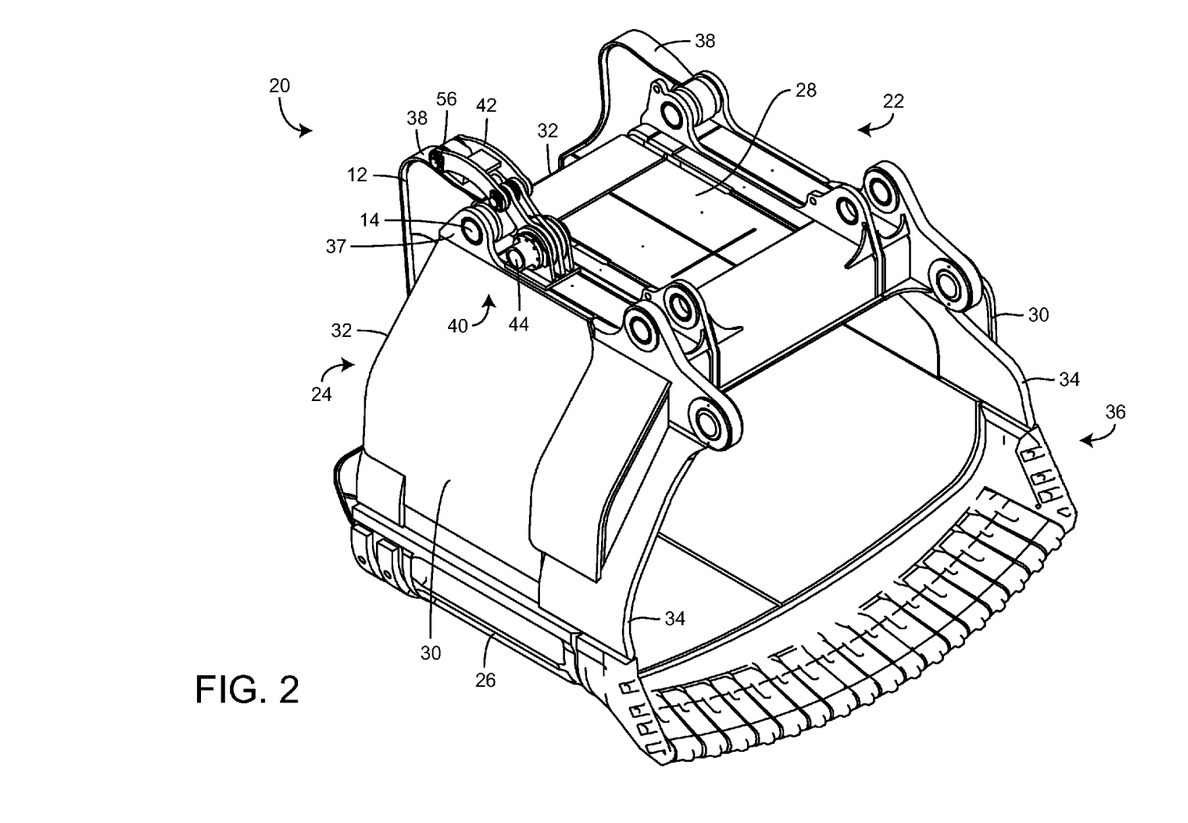
FIG. 2 is a front perspective view of a dipper assembly, according to an exemplary embodiment.
Figure 3:
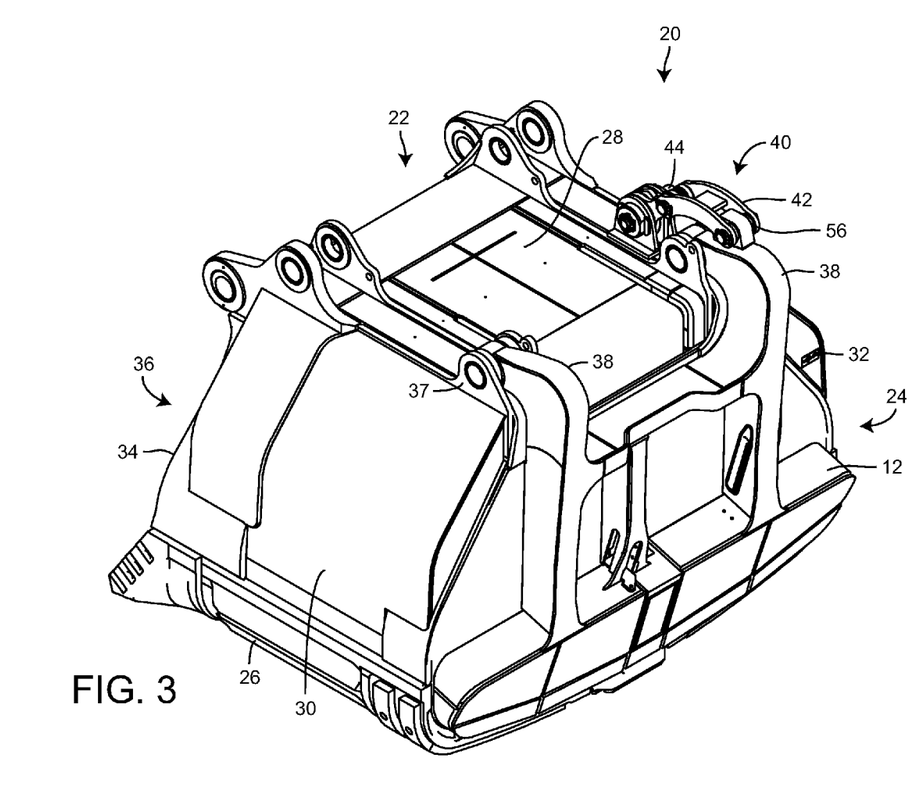
FIG. 3 is a back perspective view of the dipper assembly of FIG. 2.

Referring now to FIGS. 2 and 3, the dipper assembly 20 is shown, according to an exemplary embodiment. The dipper assembly 20 includes a dipper 22 having an open dipper bottom 24. A front wall 26 is coupled to a back wall 28 with side walls 30. Rearward edges 32 of the walls 26, 28, and 30 define the open dipper bottom 24. Forward edges 34 of the walls 26, 28, and 30 define an open forward end 36 of the dipper 22 through which the dipper 22 is filled. Teeth may be provided on the forward edge 34 of the front wall 26 to define a cutting edge that cuts into the ground to fill the dipper 22.

The dipper door 12 is pivotally connected to the dipper 22 and abuts the rearward edges 32 of the dipper walls 26, 28, and 30 to close the dipper bottom 24. A pair of L-shaped dipper door lugs 38 extend from the dipper door 12 past the dipper back wall 28 rearward edge 32. The door lugs 38 are each coupled to the dipper door mounting lugs 37 by a pinned connection 14. The dipper door 12 is configured to pivot about the pinned connection 14, swinging away from the open dipper bottom 24 toward an open position to discharge the load in the dipper 22.

Figure 4:
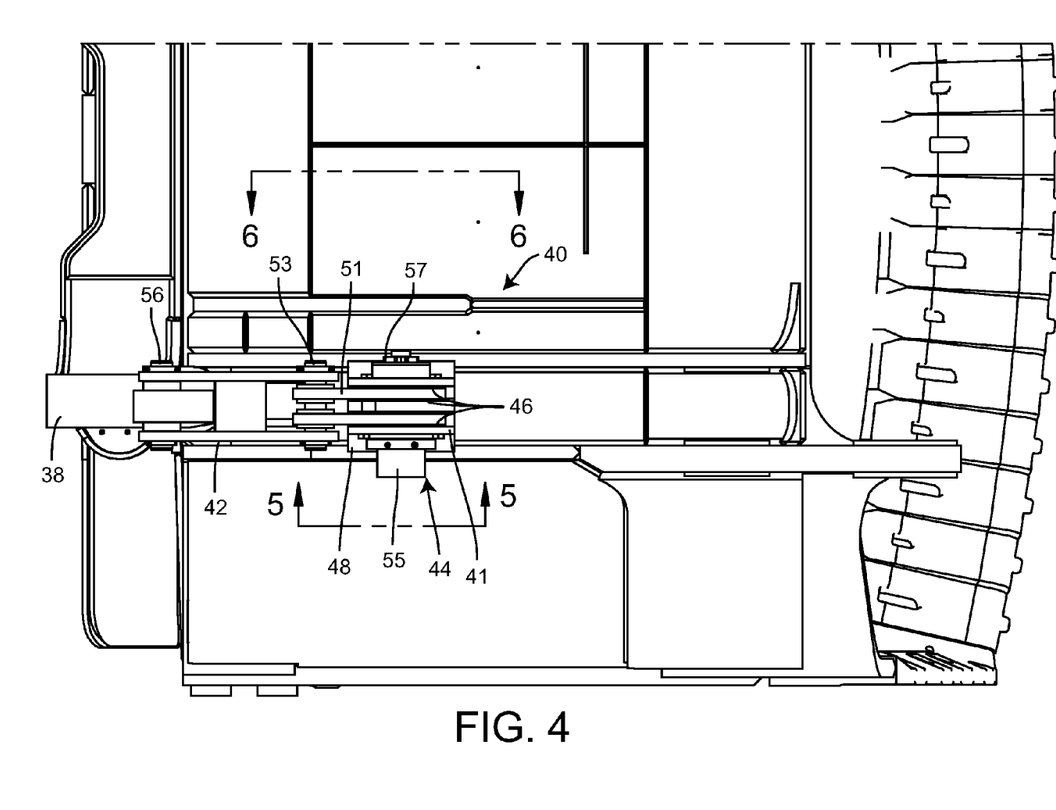
FIG. 4 is a top view of a hydraulic door snubber for a dipper assembly, according to an exemplary embodiment.

The dipper assembly 20 also includes a hydraulic door snubber 40 (see also FIG. 4). The hydraulic door snubber 40 is coupled to the dipper door 12 by a snubber link 42 and a bolted connection 56. The hydraulic door snubber 40 may engage the dipper door lugs 38 to dampen the swinging motion of the dipper door 12 as the dipper door 12 swings between the open and closed positions. The hydraulic door snubber 40 includes a hydraulic cylinder 44 configured to apply compressive force to the hydraulic door snubber 40, clamping the snubber 40 together under a substantially constant load or pressure. The hydraulic cylinder 44 is sized according to the minimum and maximum pressure required to reduce the speed of the dipper door 12. The hydraulic cylinder 44 is configured to apply a predetermined pressure to the hydraulic door snubber 40. In exemplary embodiments, the predetermined pressure is approximately twenty percent greater than the maximum pressure required to reduce the speed of the dipper door 12.

Figure 5:
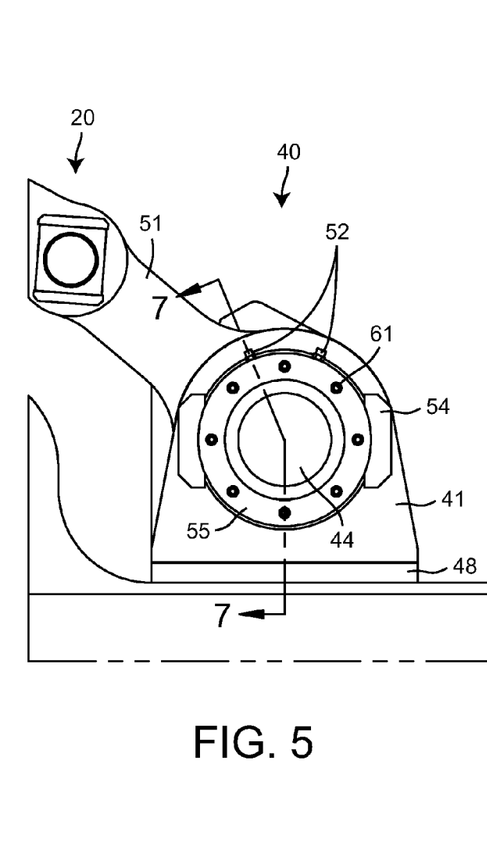
FIG. 5 is a detailed side view of the hydraulic door snubber, shown in the 5-5 direction according to FIG. 4.
Figure 6:
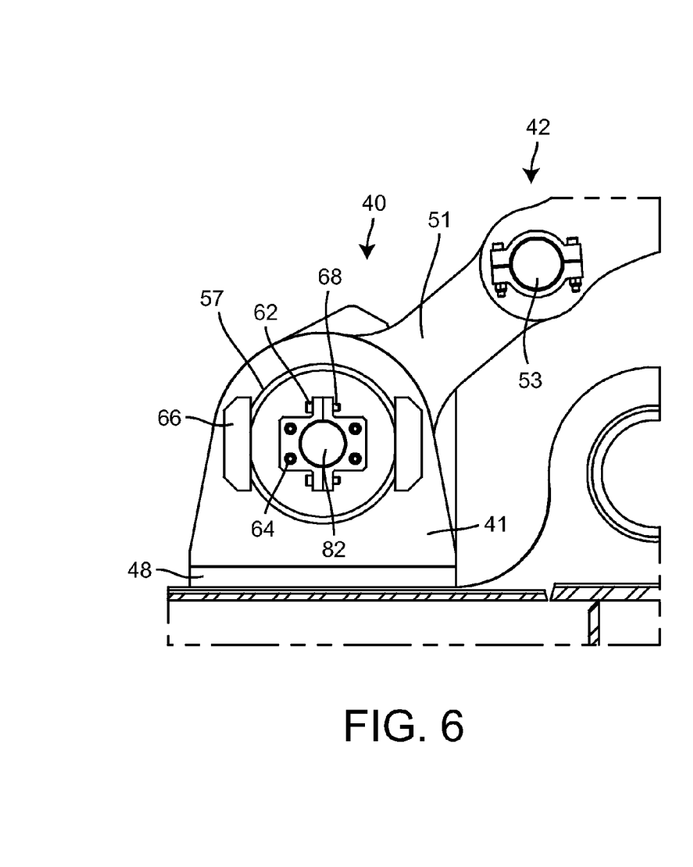
FIG. 6 is a detailed side view of the hydraulic door snubber, shown in the 6-6 direction according to FIG. 4.

The hydraulic door snubber 40 also includes a snubber base 48 (see FIGS. 5 and 6). In exemplary embodiments, the snubber base 48 is a bracket that is welded to the back wall 28 of the dipper 22. In other embodiments, the snubber base 48 may be coupled to the back wall 28 in any other manner suitable for the application. The snubber base 48 includes a connecting plate 50 that is positioned vertically on the snubber base 48 and formed to receive the hydraulic cylinder 44. The connecting plate 50 is welded to the lower portion of the snubber base 48 in exemplary embodiments. The snubber base 48 is coupled to mounting plates 41 and friction plates 46 (see also FIG. 7). The mounting plates 41 and friction plates 46 are formed to receive the hydraulic cylinder 44. The hydraulic cylinder 44 is positioned through the mounting plates 41, the friction plates 46, the connecting plate 50, and the snubber link 42, pivotally coupling the snubber link 42 to the snubber base 48. The hydraulic cylinder 44 is connected to a hydraulic system 80 that supplies pressurized hydraulic fluid to the hydraulic cylinder 44. The hydraulic system 80 is shown in further detail in FIG. 8. The hydraulic door snubber 40 is shown in further detail in FIGS. 4 through 7.

Referring further to FIG. 4, a top view of the hydraulic door snubber 40 is shown, according to an exemplary embodiment. As shown in FIG. 4, the hydraulic door snubber 40 is coupled to the dipper door 12 by the snubber link 42. The snubber link 42 has a first end that is coupled to the dipper door lugs 38. The snubber link 42 may be coupled to the dipper door lugs 38 by a pinned connection, or by any other connecting hardware. The snubber link 42 has a second end that is pivotally coupled to the snubber base 48. As the dipper door 12 rotates between an open and closed position, the snubber link 42 pivots relative to the snubber base 48.

In exemplary embodiments, the snubber link 42 includes two mating plates 51 that extend from a bolted connection 53 and are configured to mate with two mounting plates 41 and a connecting plate 50 that forms a portion of the snubber base 48. Four friction plates 46 are positioned in between the mating plates 51, the mounting plates 41, and the connecting plate 50 (shown in further detail in FIG. 7). In other exemplary embodiments, the hydraulic door snubber 40 may include more or less plates 41, 46, 50, and 51, as is suitable for the particular application. For instance, the number of friction plates 46 and mounting plates 41 may be modified based on the size and weight of the dipper door 12. The hydraulic cylinder 44 extends through the mounting plates 41, friction plates 46, mating plates 51, and connecting plate 50, which are each formed to receive the hydraulic cylinder 44. The hydraulic cylinder 44 is positioned within the snubber base 48, having a head portion 55 and a tail portion 57 protruding from opposite ends of the snubber base 48. The hydraulic cylinder 44 is configured to apply a substantially constant compressive force to the plates 41, 46, 50, and 51 regardless of the effects of wear on plates 41, 46, 50, and 51, clamping the plates 41, 46, 50, and 51, and thus reducing the swing speed of the dipper door 12.

Referring now to FIG. 5, a cross-section of the hydraulic door snubber 40 is shown in the 5-5 direction according to FIG. 4. The hydraulic door snubber 40 includes one or more connectors 52. The connectors 52 are openings in the hydraulic door snubber 40 that are configured to receive or distribute fluids. In exemplary embodiments, the connectors 52 are configured to provide a fluid connection from the hydraulic cylinder 44 to a hydraulic pump 94 (shown in FIG. 8). The hydraulic pump 94 is intended to introduce pressurized hydraulic fluid into the cylinder 44 to provide a compressive force for the hydraulic door snubber 40. In other embodiments, the connectors 52 provide a fluid connection to the outside atmosphere through a filter, so that air can be released from the base of the hydraulic cylinder 44. The connectors 52 may also fluidly connect the hydraulic cylinder 44 to any other component, as is suitable for the particular application.

According to the illustrated embodiment of FIG. 5, the head portion 55 of the hydraulic cylinder 44 is held within the hydraulic door snubber 40 by one or more screws 58. The screws 58 couple the hydraulic cylinder 44 to the mounting plate 41, securing the head portion 55 of the cylinder 44 to the mounting plate 41 and thus the hydraulic door snubber 40. The hydraulic door snubber 40 also includes one or more bars 54 configured to secure the head portion 55 of the hydraulic cylinder 44. The bars 54 are coupled to the mounting plate 41 and are formed to accommodate the cylindrical walls of the head portion 55. The bars 54 are configured to prevent the hydraulic cylinder 44 from rotating relative to the mounting plate 41 as the dipper door 12 operates.

The hydraulic door snubber 40 also includes a piston 82 (shown in FIG. 7) substantially within the hydraulic cylinder 44 and a retainer 62 (shown in FIG. 6) configured to secure the piston 82 to the tail portion 57 of the hydraulic cylinder 44. As the hydraulic reservoir 43 is filled with pressurized fluid, the piston 82 is pulled inward (e.g. toward the head portion 55) along with the retainer 62, applying a compressive force on the plates 41, 46, 50, and 51, and into the center of the hydraulic door snubber 40. The bars 54 at the head portion 55 of the hydraulic cylinder 44 retain the position of the cylinder 44, preventing the hydraulic cylinder 44 from rotating relative to the mounting plate 41 or pushing out of the hydraulic door snubber 40. The head portion 55 of the cylinder 44 applies a force in the opposite direction of the piston 82 (shown in further detail in FIG. 7), compressing the plates 41, 46, 50, and 51. When the mating plates 51 are compressed, the rotational movement of the snubber link 42 around the snubber base 48 is restricted, which reduces the dipper door 12 speed as it moves between an open and closed position. Although the hydraulic cylinder 44 is shown by way of example to "pull" the piston 82 in order to apply a compressive force, the hydraulic cylinder 44 may be configured to "push" in order to apply a compressive force, according to other embodiments.

Referring now to FIG. 6, a detailed side view of the hydraulic door snubber 40 is shown in the 6-6 direction according to FIG. 4. In exemplary embodiments, the retainer 62 includes two mirrored (i.e. symmetric) pieces formed around the piston 82. The two pieces of the retainer 62 are coupled to each other by a locking assembly 68. The retainer 62 may be tightened at the locking assembly 68, fitting the retainer 62 around the piston 82. In exemplary embodiments, the piston 82 includes a recessed portion 72 (shown in FIG. 7) to accommodate the retainer 62. The recessed portion 72 is formed to mate with the retainer 62. The retainer 62 is coupled to the mounting plate 41 by one or more locking assemblies 64. The locking assemblies 64 and 68 may include any locking hardware that is suitable for the particular application. The hydraulic door snubber 40 also includes one or more bars 66 coupled to the mounting plate 41. The bars 66 are formed to fit the tail portion 57 of the hydraulic cylinder 44, and are configured to prevent the tail portion 57 from rotating relative to the mounting plate 41.

The retainer 62 is intended to hold the hydraulic cylinder 44 within the hydraulic door snubber 40 as the cylinder 44 applies a compressive force, and is pressed against the mounting plates 41 by the force of the pressurized fluid pulling the hydraulic cylinder 44. An opposing force is provided at the head portion 55 of the hydraulic cylinder 44. The head portion 55 is connected to the housing 59 by one or more screws 61 (shown in FIG. 7), so that the head portion 55 is pressed against the housing 59 in response to the cylinder 44 being pulled by the pressurized fluid. The two opposing forces compress the friction plates 46, mating plates 51, mounting plates 41, and connecting plate 50, restricting the rotational movement of the mating plates 51, and thus reducing the speed of the dipper door 12 as it moves between an open and closed position.

Figure 7:
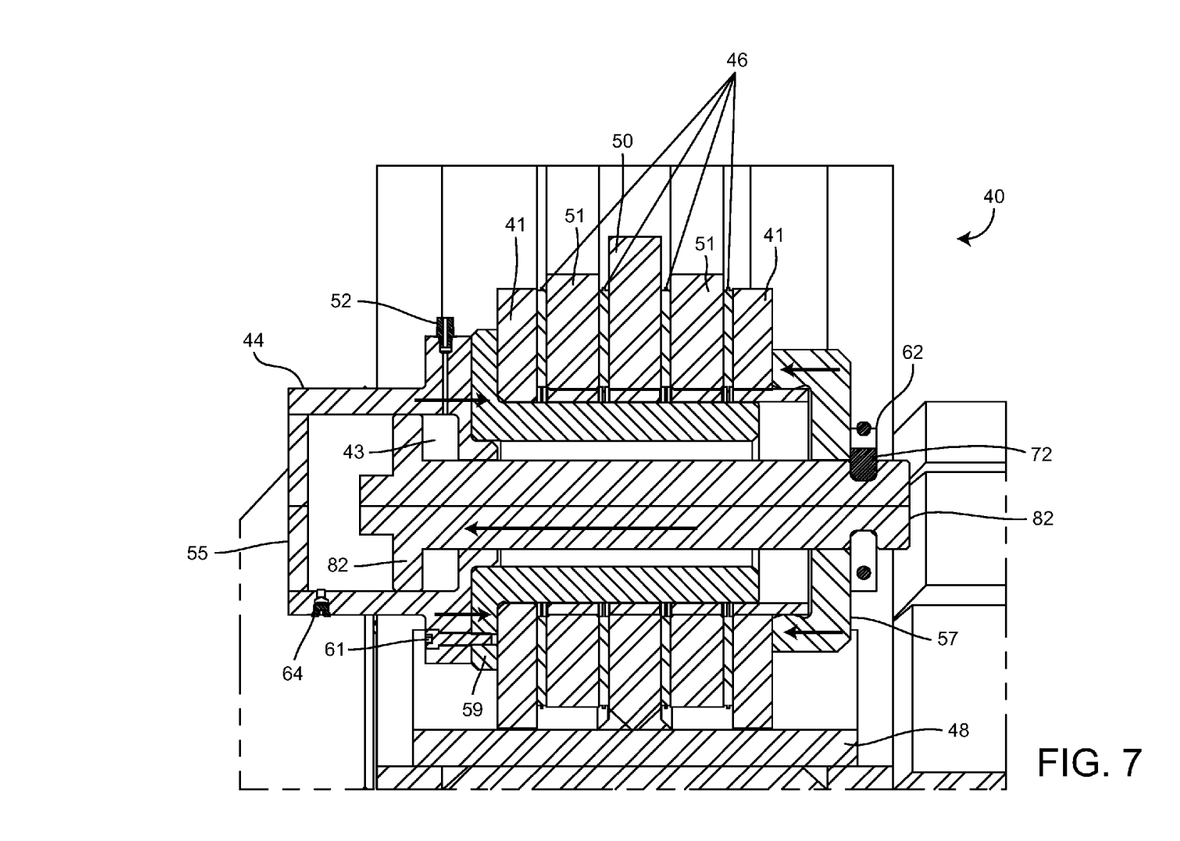
FIG. 7 is a cross-section view of the hydraulic door snubber, shown in the 7-7 direction according to FIG. 5.

Referring now to FIG. 7, a detailed side view of the hydraulic door snubber 40 is shown in the 7-7 direction according to FIG. 5. The retainer 62 is formed around the recessed portion 72 of the hydraulic cylinder 44. The retainer 62 is intended to prevent the piston 82 from being pulled through the tail portion 57 of the hydraulic cylinder 44. The hydraulic cylinder 44 includes a hydraulic reservoir 43 configured to receive pressurized hydraulic fluid from the hydraulic pump 94 through the connector 52. In exemplary embodiments, the reservoir 43 is filled with hydraulic fluid, pulling the piston 82 (i.e. the tail portion 57) to the left (according to FIG. 7), toward the center of the snubber base 48. The retainer 62 is pressed against the hydraulic cylinder 44 by the piston 82, creating a force against the snubber base 48 in the same direction as the movement of the tail portion 57 of the hydraulic cylinder 44. An opposing force is provided at the head portion 55 of the hydraulic cylinder 44. The head portion 55 is pressed against the housing 59 in response to the piston 82 being pulled by the pressurized fluid. The two opposing forces compress the friction plates 46, mating plates 51, mounting plates 41, and connecting plate 50. The friction created by the compressive force restricts the rotational movement of the mating plates 51, and thus the snubber link 42. As the rotational movement of the snubber link 42 is restricted, the speed of the dipper door 12 is reduced as it moves between an open and closed position.

Figure 8:
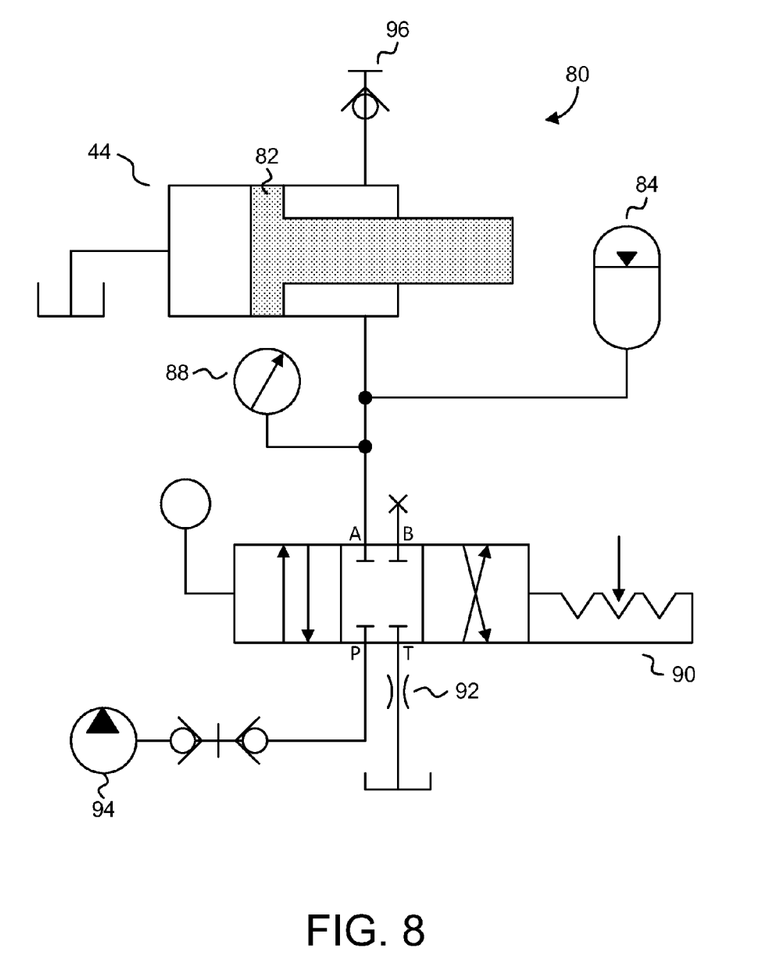
FIG. 8 is a schematic representation of a hydraulic system of the present disclosure, according to an exemplary embodiment.

Referring now to FIG. 8, a schematic for the hydraulic system 80 is shown, according to an exemplary embodiment. The hydraulic cylinder 44 is fluidly connected to an accumulator 84. In exemplary embodiments, the accumulator 84 is a gas charge accumulator. The accumulator 84 stores and supplies hydraulic fluid to the cylinder 44, creating a force on the piston 82 within the cylinder 44. The force of the fluid pushing on the piston 82 causes the plates 41, 46, 50, and 51 to clamp together, restricting the rotational movement of the snubber link 42 around the snubber base 48, and reducing the swing speed of the dipper door 12. The accumulator 84 may be charged to a predetermined pressure configured to provide the required clamping force (i.e. the force required to slow the dipper door 12 to the desired speed) to the cylinder 44.

The hydraulic system 80 also includes a valve 90. The valve 90 is configured to fill the hydraulic system 80 with pressurized fluid. The valve 90 is also configured to discharge pressurized hydraulic fluid from the system 80, if necessary. For instance, fluid may need to be removed from the system 80 in order to perform maintenance or other services. The system 80 includes a drain 92 at the valve 90 for draining hydraulic fluid, as necessary.

The system 80 may be recharged or the clamping force may be increased by pumping fluid into the system 80 with the use of a hydraulic pump 94. The hydraulic pump 94 may be a portable hand pump attached to the valve 90, in exemplary embodiments. In other embodiments, the hydraulic pump 94 may be a remote pressure source, or another source of pressurized hydraulic fluid. The hydraulic pump 94 is configured to pump fluid into the system 80 until the predetermined fluid pressure is reached. The system 80 also includes a gauge 88 that is configured to monitor and indicate the fluid pressure within the system 80. The gauge 88 may provide the fluid pressure by a visual or audible output, or by any other manner suitable for the application. The system 80 also includes a bleed valve 96 at the cylinder 44, configured to release air from the system 80 as necessary.

Figure 9:
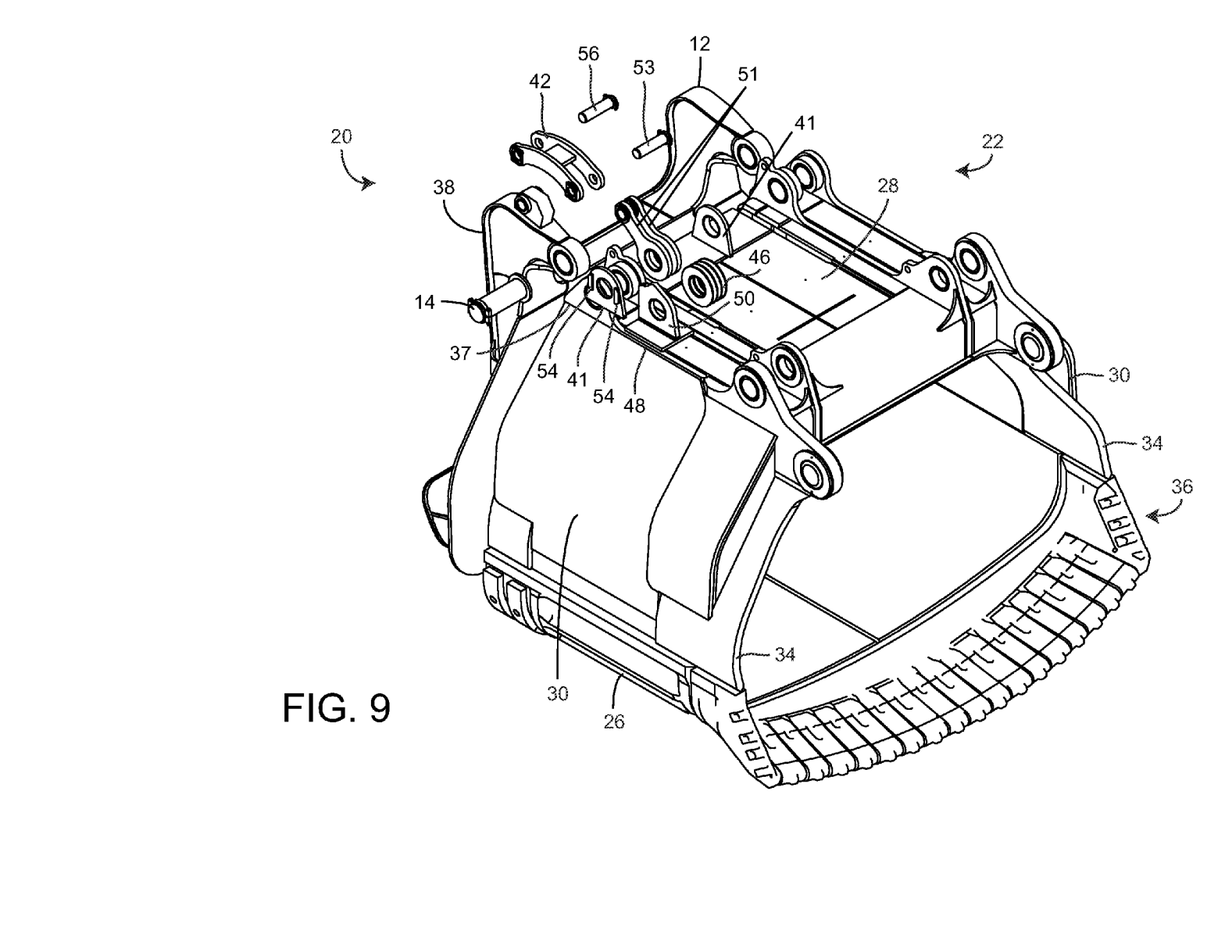
FIG. 9 is an exploded front perspective view of the hydraulic door snubber to dipper door connection, according to an exemplary embodiment.
Figure 10:
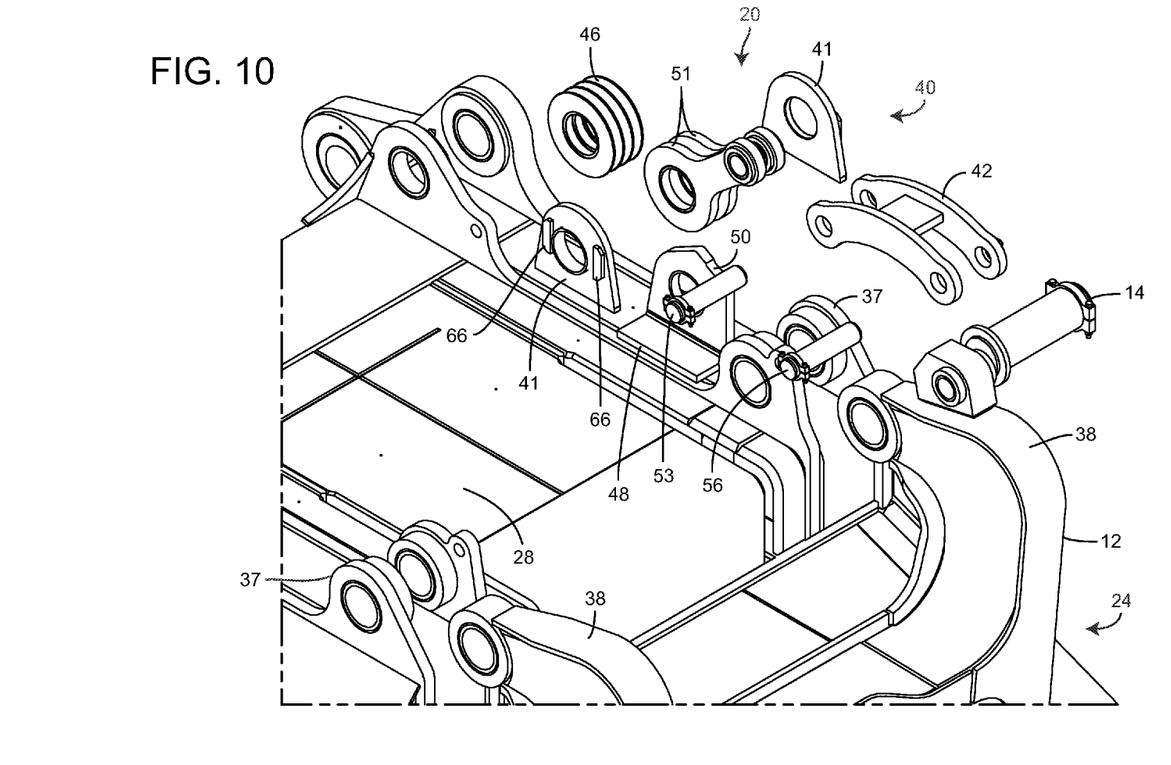
FIG. 10 is a close-up exploded back perspective view of the hydraulic door snubber to dipper door connection, according to an exemplary embodiment.

Referring now to FIGS. 9 and 10, exploded views of the connection between the hydraulic door snubber 40 and the dipper 22 are shown, with the hydraulic cylinder 44 removed for clarity, and according to an exemplary embodiment. The mounting plates 41, friction plates 46, and mating plates 51 are mated and coupled to the dipper assembly 20 at the snubber base 48. The plates 41, 46, and 51 are coupled to the connecting plate 50 at the snubber base 48 by the hydraulic cylinder 44. The mating plates 51 are coupled to the snubber link 42 by the bolted connection 53, also coupling the snubber base 48 to the snubber link 42. The snubber link 42 is then coupled to the dipper door 12 by the bolted connection 56, and the dipper door 12 is coupled to the dipper assembly 20 by the pinned connection 14. In this way, the hydraulic door snubber 40 is configured to control the swing speed of the dipper door 12, slowing the dipper door 12 as it moves between the open and closed positions.

The construction and arrangements of the hydraulic door snubber, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

INDUSTRIAL APPLICABILITY

The disclosed hydraulic door snubber may be implemented into any rope shovel or other excavator having a bucket with a door. The disclosed hydraulic door snubber may reduce the swing speed of the shovel door by providing a hydraulic cylinder to clamp the snubber, restricting the rotational movement of the dipper door. The disclosed hydraulic door snubber may also reduce the frequency of maintenance or pressure adjustment by clamping the disks with a constant load. While a bolted connection may lose clamping pressure as the friction disks wear, the force of the hydraulic cylinder charged by an accumulator compensates for the friction material wear.

It will be apparent to those skilled in the art that various modifications and variations can be made to the disclosed hydraulic door snubber. Other embodiments will be apparent to those skilled in the art from consideration of the specification and practice of the disclosed hydraulic door snubber. It is intended that the specification and examples be considered as exemplary only, with a true scope being indicated by the following claims and their equivalents.

What is claimed is:

1. A dipper assembly for a mining shovel, the dipper assembly comprising:
   a dipper having a dipper back and an open dipper bottom;
   a dipper door pivotally mounted to the dipper, configured to pivot between an open position and a closed position with a swing speed, and to cover the open dipper bottom; and
   a hydraulic snubber, comprising:
      a base having one or more connecting plates;
      one or more mounting plates coupled to the base and configured to receive a link extending from the dipper door;
      one or more friction plates positioned parallel to the mounting plates and the link; and
      a hydraulic cylinder positioned through the mounting plates, the connecting plates, the friction plates, and the link to pivotally couple the link to the base, wherein the hydraulic cylinder includes a head portion protruding from a first end of the hydraulic snubber, a tail portion protruding from a second end of the hydraulic snubber opposite the first end, and a piston positioned through the plates and the link and extending out from the tail portion, wherein the hydraulic cylinder is configured to clamp the mounting plates, the connecting plates, the friction plates and the link together and reduce the swing speed of the dipper door by the piston pulling inward against the tail portion and toward the head portion, causing the tail portion and the head portion to apply a substantially constant compressive force to the plates and the link regardless of wear on the plates and the link.

2. The dipper assembly of claim 1, further comprising a hydraulic system, the hydraulic system comprising:
   an accumulator configured to supply pressurized hydraulic fluid to the hydraulic cylinder to pull the piston inward and clamp the plates and the link, wherein the accumulator is charged to a predetermined pressure to supply the pressurized fluid required to apply the substantially constant compressive force regardless of wear on the plates and the link, and wherein the substantially constant compressive force is the force required to slow the swing speed of the dipper door to a desired speed;
   a valve configured to fill and bleed the hydraulic system;
   a hydraulic pump configured to supply pressurized hydraulic fluid to the accumulator, wherein the hydraulic pump is configured to charge the accumulator to the predetermined pressure; and
   a gauge configured to monitor and indicate the fluid pressure within the hydraulic system.

3. The dipper assembly of claim 2, wherein the hydraulic pump is a portable hand pump configured to fluidly connect to the hydraulic cylinder.

4. The dipper assembly of claim 1, further comprising a retainer coupled to the hydraulic snubber, the retainer formed around the piston and configured to press against the tail portion of the hydraulic cylinder to apply the compressive force to the plates and the link and retain the position of the piston within the hydraulic snubber and extending from the tail portion when the piston is pulled inward against the tail portion.

5. The dipper assembly of claim 4, wherein the piston comprises a recessed portion configured to receive the retainer.

6. The dipper assembly of claim 1, wherein the link further comprises a first end receiving the hydraulic cylinder and pivotally coupled to the hydraulic snubber, and a second end coupled to the dipper door, wherein the link is configured to pivot about the base as the dipper door moves between the open and closed position.

7. The dipper assembly of claim 6, wherein the first end comprises one or more mating plates, the mating plates positioned parallel to the mounting plates, connecting plate, and friction plates, a friction plate separating each of the mounting plates, mating plate and connecting plate.

8. The dipper assembly of claim 7, wherein the hydraulic snubber includes two mounting plates, four friction plates, and one connecting plate, and the link includes two mating plates, the two mounting plates at outside edges of the hydraulic snubber, the two mating plates inside of the mounting plates, and the connecting plate at the center of the hydraulic snubber, each of the mounting plates, mating plates, and connecting plate separated by one friction plate, the plates positioned adjacent and parallel to each other and configured to compress in response to the compressive force of the hydraulic cylinder.

9. The dipper assembly of claim 1, further comprising one or more bars configured to retain the position of the head portion of the hydraulic cylinder relative to the one or more mounting plates at the first end of the plates when the piston is pulled inward against the tail portion.

10. The dipper assembly of claim 1, the hydraulic cylinder further comprising one or more openings, the openings configured to receive or distribute fluids.

11. A hydraulic snubber for a door, comprising:
a base having one or more connecting plates configured to mate with one or more mating plates of a pivotally mounted link extending from the door;
one or more mounting plates coupled to the base and configured to receive the one or more mating plates of the link extending from the door;
one or more friction plates positioned adjacent to and parallel with the one or more mounting plates and configured to be adjacent to and parallel with the one or more mating plates of the link; and
a hydraulic cylinder configured to be positioned through the connecting plates, the mounting plates, the friction plates, and the mating plates to pivotally couple the link to the base, wherein the hydraulic cylinder includes a head portion protruding from a first end of the hydraulic snubber, a tail portion protruding from a second end of the hydraulic snubber opposite the first end, and a piston positioned through each of the plates and extending out from the tail portion, wherein the hydraulic cylinder is configured to clamp the connecting plates, the mounting plates, the friction plates and the mating plates of the link together and restrict pivotal movement of the link by pulling the piston inward against the tail portion and toward the head portion, causing the tail portion and the head portion to apply a compressive force to the plates of the hydraulic snubber and the link.

12. The hydraulic snubber of claim 11, wherein the link has a first end receiving the hydraulic cylinder and pivotally coupled to the hydraulic snubber, and has a second end configured to couple to a pivotally mounted door, and the link is configured to pivot about the base as the door moves between an open and closed position, and wherein the hydraulic cylinder is configured to clamp the mounting plates, the friction plates and the link together, reducing the pivotal movement of the link about the base.

13. The hydraulic snubber of claim 11, further comprising a retainer coupled to the hydraulic snubber, the retainer formed around the cylinder piston and configured to press against the tail portion of the cylinder to apply the compressive force to the plates and retain the position of the piston within the hydraulic snubber and extending from the tail portion when the piston is pulled inward against the tail portion.

14. The hydraulic snubber of claim 13, wherein the piston comprises a recessed portion configured to receive the retainer.

15. The hydraulic snubber of claim 11, wherein the one or more mating plates are positioned parallel to the mounting plates and friction plates, a friction plate positioned between each mounting plate and mating plate.

16. The hydraulic snubber of claim 15, wherein the hydraulic snubber includes two mounting plates, four friction plates, and one connecting plate, and the link includes two mating plates.

17. The hydraulic snubber of claim 16, wherein the two mounting plates are positioned at outside edges of the hydraulic snubber, the two mating plates positioned inside of the mounting plates, and the connecting plate at the center of the hydraulic snubber, each of the mounting plates, mating plates, and connecting plate separated by one friction plate, the plates positioned adjacent and parallel to each other and configured to compress in response to the compressive force of the hydraulic cylinder.

18. The hydraulic snubber of claim 11, further comprising one or more bars configured to retain the position of the head portion of the hydraulic cylinder relative to the one or more mounting plates at the first end of the plates when the piston is pulled inward against the tail portion.

19. A method for installing a hydraulic snubber for a dipper door, the method comprising:
providing a base having one or more connecting plates configured to receive a hydraulic cylinder;
providing one or more mounting plates configured to receive the hydraulic cylinder;
providing one or more friction plates configured to receive the hydraulic cylinder;
providing a link configured to pivot about the base, the link having one or more mating plates configured to receive the hydraulic cylinder;
positioning the mounting plates, friction plates, connecting plates, and mating plates adjacent to and parallel to each other;
inserting a hydraulic cylinder through the connecting plates of the base and through each of the mounting plates, friction plates, and mating plates to pivotally couple the link to the base, wherein the hydraulic cylinder includes a head portion protruding from a first end of the plates, a tail portion protruding from a second end of the plates opposite the first end, and a piston positioned through each of the plates and extending out from the tail portion;
retaining the hydraulic cylinder substantially within the base; and
applying a compressive force to the connecting plates, the mounting plates, the friction plates, and the mating plates by pumping pressurized hydraulic fluid into the hydraulic cylinder, wherein the pressurized hydraulic fluid pulls the piston inward against the tail portion and toward the head portion, causing the tail portion and the head portion to apply the compressive force to the plates, clamping the plates to reduce the pivotal motion of the link about the base, and wherein the compressive force applied to the plates is substantially constant regardless of wear on the plates.

20. The method of claim 19, further comprising coupling a removable retainer to the piston, the removable retainer retaining the hydraulic cylinder substantially within the base when the retainer is installed and the piston is pulled inward toward the head portion, and allowing the hydraulic cylinder to be removed from the base when the retainer is removed.

* * * * *